(12) United States Patent
Lohmeijer et al.

(10) Patent No.: US 8,399,579 B2
(45) Date of Patent: Mar. 19, 2013

(54) PROCESS FOR PREPARING AN AQUEOUS COMPOSITE-PARTICLE DISPERSION

(75) Inventors: Bas Lohmeijer, Mannheim (DE); Harm Wiese, Laudenbach (DE); Ekkehard Jahns, Weinheim (DE)

(73) Assignee: BASF SE, Ludwigshafen (DE)

( * ) Notice: Subject to any disclaimer, the term of this patent is extended or adjusted under 35 U.S.C. 154(b) by 1 day.

(21) Appl. No.: 13/257,673

(22) PCT Filed: Mar. 31, 2010

(86) PCT No.: PCT/EP2010/054332

§ 371 (c)(1),
(2), (4) Date: Sep. 20, 2011

(87) PCT Pub. No.: WO2010/118961

PCT Pub. Date: Oct. 21, 2010

(65) Prior Publication Data

US 2012/0016060 A1 Jan. 19, 2012

(30) Foreign Application Priority Data

Apr. 15, 2009 (EP) .................................... 09157984

(51) Int. Cl.
- C08F 2/00 (2006.01)
- C08F 2/22 (2006.01)

(52) U.S. Cl. ............ 526/80; 524/832; 524/858; 526/78; 526/79

(58) Field of Classification Search .................. 524/832, 524/858; 526/78, 79, 80
See application file for complete search history.

(56) References Cited

U.S. PATENT DOCUMENTS

| | | | |
|---|---|---|---|
| 6,001,922 A * | 12/1999 | Clark et al. | 524/513 |
| 6,225,401 B1 * | 5/2001 | Rehmer et al. | 524/800 |
| 6,683,145 B2 * | 1/2004 | Grandhee | 526/307.7 |
| 6,756,437 B1 * | 6/2004 | Xue et al. | 524/401 |
| 6,833,401 B1 | 12/2004 | Xue et al. | |
| 8,188,197 B2 * | 5/2012 | Gubaydullin et al. | 526/59 |
| 2004/0156994 A1 * | 8/2004 | Wiese et al. | 427/372.2 |
| 2004/0171728 A1 * | 9/2004 | Xue et al. | 524/420 |
| 2006/0191653 A1 | 8/2006 | Wiese et al. | |
| 2008/0051500 A1 * | 2/2008 | Wiese | 524/431 |
| 2009/0317626 A1 * | 12/2009 | Tiarks et al. | 428/331 |
| 2010/0144922 A1 * | 6/2010 | Tuchbreiter et al. | 523/209 |
| 2010/0216942 A1 * | 8/2010 | Lohmeijer et al. | 524/588 |
| 2011/0039995 A1 * | 2/2011 | Lohmeijer et al. | 524/130 |
| 2011/0184088 A1 | 7/2011 | Lohmeijer et al. | |
| 2011/0207851 A1 | 8/2011 | Lohmeijer et al. | |
| 2012/0016060 A1 * | 1/2012 | Lohmeijer et al. | 524/3 |

FOREIGN PATENT DOCUMENTS

| | | |
|---|---|---|
| WO | 01 18081 | 3/2001 |
| WO | 01 29106 | 4/2001 |
| WO | 03 000760 | 1/2003 |
| WO | 2004 092481 | 10/2004 |

OTHER PUBLICATIONS

Fu, L., et al., "Study on Encapsulation of Organic Polymers in the Presence of Inorganic Sol Particles," Journal of Tianjin University, No. 4, Total 7 Pages, (1991).

Bourgeat-Lami, E., et al., "Emulsion Polymerization in the presence of colloidal silica particles," Die Angewandte Makromolekulare Chemie, vol. 242, pp. 105-122 (1996).

Paulke, B., et al., "Synthesis Studies on Paramagnetic Polystyrene Latex Particles," Proceedings of an International Conference on Scientific and Clinical Applications of Magnetic Carriers, pp. 69-76, (Sep. 5-7, 1996).

Barthet, C., et al., "Synthesis of Novel Polymer-Silica Colloidal Nanocomposites via Free-Radical Polymerization of Vinyl Monomers," Advanced Materials, vol. 11, No. 5, pp. 408-410, (1999).

International Search Report Issued Jul. 20, 2010 in PCT/EP10/054332 Filed Mar. 31, 2010.

* cited by examiner

*Primary Examiner* — David W Wu
*Assistant Examiner* — Michael A Salvitti
(74) *Attorney, Agent, or Firm* — Oblon, Spivak, McClelland, Maier & Neustadt, L.L.P.

(57) ABSTRACT

A process for preparing stable aqueous dispersions of composite particles.

19 Claims, No Drawings

PROCESS FOR PREPARING AN AQUEOUS COMPOSITE-PARTICLE DISPERSION

The present invention relates to a process for preparing an aqueous dispersion of particles composed of addition polymer and finely divided inorganic solid (aqueous composite-particle dispersion), in which process ethylenically unsaturated monomers are dispersely distributed in aqueous medium and polymerized by the method of free-radical aqueous emulsion polymerization by means of at least one free-radical polymerization initiator in the presence of at least one dispersely distributed, finely divided inorganic solid and at least one dispersant, and which process comprises a) using 1% to 1000% by weight of an inorganic solid having an average particle size $\leq 100$ nm and 0.05% to 2% by weight of a free-radical polymerization initiator, based on the total amount of ethylenically unsaturated monomers (total monomer amount), b) including at least a portion of the inorganic solid in an initial charge in an aqueous polymerization medium in the form of an aqueous dispersion of solids, subsequently c) metering a total of $\geq 0.01\%$ and $\leq 20\%$ by weight of the total monomer amount of ethylenically unsaturated monomers and $\geq 60\%$ by weight of the total amount of free-radical polymerization initiator into the resulting aqueous dispersion of solids, and polymerizing the ethylenically unsaturated monomers metered in, under polymerization conditions, up to a monomer conversion of $\geq 80\%$ by weight (polymerization stage 1), and subsequently d) metering any remainder of the inorganic solid, any remainder of the free-radical polymerization initiator, and the remainder of the ethylenically unsaturated monomers into the resultant polymerization mixture under polymerization conditions, and carrying out polymerization to a monomer conversion of $\geq 90\%$ by weight (polymerization stage 2).

Aqueous composite-particle dispersions are a matter of general knowledge. They are aqueous fluid systems comprising in disperse distribution, in the aqueous dispersion medium, addition-polymer coils, consisting of a plurality of interwoven addition-polymer chains, referred to as the polymer matrix, and particles of finely divided inorganic solid (composite particles). The average diameter of the composite particles is generally in the range $\geq 10$ nm and $\leq 1000$ nm, often in the range $\geq 50$ nm and $\leq 400$ nm, and frequently in the range $\geq 100$ nm and $\leq 300$ nm.

Composite particles and processes for preparing them in the form of aqueous composite-particle dispersions, and also their use, are known to the skilled worker and are disclosed for example in the specifications U.S. Pat. Nos. 3,544,500, 4,421,660, 4,608,401, 4,981,882, EP-A 104 498, EP-A 505 230, EP-A 572 128, GB-A 2 227 739, WO 0118081, WO 0129106, WO 03000760, WO 06072464 and WO 08135422 and also in Long et al., Tianjin Daxue Xuebao 1991, 4, pages 10 to 15, Bourgeat-Lami et al., Die Angewandte Makromolekulare Chemie 1996, 242, pages 105 to 122, Paulke et al., Synthesis Studies of Paramagnetic Polystyrene Latex Particles in Scientific and Clinical Applications of Magnetic Carriers, pages 69 to 76, Plenum Press, New York, 1997, and Armes et al., Advanced Materials 1999, 11, No. 5, pages 408 to 410.

Furthermore, the unpublished European patent application with the application number 07119197.7 discloses the use of compounds containing silanol groups for preparing aqueous composite-particle dispersions.

The aqueous composite-particle dispersions prepared by the processes disclosed in the prior art, however, are frequently unable to give full satisfaction with regard to the resultant coagulum contents.

It was therefore an object of the present invention to provide a new preparation process for stable aqueous composite-particle dispersions which feature a low coagulum content.

Surprisingly, this object was achieved by the process defined in the introduction.

The process of the invention uses clear water, such as clear drinking water, for example, but, with particular advantage, deionized water, whose total amount is $\geq 30\%$ and $\leq 99\%$ and advantageously $\geq 35\%$ and $\leq 95\%$, and with particular advantage $\geq 40\%$ and $\leq 90\%$, by weight, based on the aqueous composite-particle dispersion. In accordance with the invention, at least a portion of the water is included in the initial charge to the polymerization vessel in step b) of the process, and any remainder is metered in in at least one of subsequent steps c) or d).

Finely divided inorganic solids suitable for the process of the invention are in principle all those which have an average particle diameter $>0$ and $\leq 100$ nm.

Finely divided inorganic solids which can be used in accordance with the invention are in principle metals, metal compounds, such as metal oxides and metal salts, and also semimetal compounds and nonmetal compounds. Finely divided metal powders which can be used are noble metal colloids, such as palladium, silver, ruthenium, platinum, gold, and rhodium, for example, and their alloys. Examples that may be mentioned of finely divided metal oxides include titanium dioxide (commercially available, for example, as Hombitec® grades from Sachtleben Chemie GmbH), zirconium(IV) oxide, tin(II) oxide, tin(IV) oxide (commercially available, for example, as Nyacol® SN grades from Nyacol Nano Technologies Inc.), aluminum oxide (commercially available, for example, as Nyacol® AL grades from Nyacol Nano Technologies Inc.), barium oxide, magnesium oxide, various iron oxides, such as iron(II) oxide (wuestite), iron(III) oxide (hematite) and iron(II/III) oxide (magnetite), chromium(III) oxide, antimony(III) oxide, bismuth(III) oxide, zinc oxide (commercially available, for example, as Sachtotec® grades from Sachtleben Chemie GmbH), nickel(II) oxide, nickel(III) oxide, cobalt(II) oxide, cobalt(III) oxide, copper(II) oxide, yttrium(III) oxide (commercially available, for example, as Nyacol® YTTRIA grades from Nyacol Nano Technologies Inc.), cerium(IV) oxide (commercially available, for example, as Nyacol® CEO2 grades from Nyacol Nano Technologies Inc.), amorphous and/or in their different crystal modifications, and also their hydroxy oxides, such as, for example, hydroxytitanium(IV) oxide, hydroxy-zirconium (IV) oxide, hydroxyaluminum oxide (commercially available, for example, as Disperal® grades from Sasol Germany GmbH) and hydroxyiron(III) oxide, amorphous and/or in their different crystal modifications. The following metal salts, amorphous and/or in their different crystal structures, can be used in principle in the process of the invention: sulfides, such as iron(II) sulfide, iron(III) sulfide, iron(II) disulfide (pyrite), tin(II) sulfide, tin(IV) sulfide, mercury(II) sulfide, cadmium(II) sulfide, zinc sulfide, copper(II) sulfide, silver sulfide, nickel(II) sulfide, cobalt(II) sulfide, cobalt(III) sulfide, manganese(II) sulfide, chromium(III) sulfide, titanium(II) sulfide, titanium(III) sulfide, titanium(IV) sulfide, zirconium(IV) sulfide, antimony(III) sulfide, and bismuth (III) sulfide, hydroxides, such as tin(II) hydroxide, aluminum hydroxide, magnesium hydroxide, calcium hydroxide, barium hydroxide, zinc hydroxide, iron(II) hydroxide, and iron(III) hydroxide, sulfates, such as calcium sulfate, strontium sulfate, barium sulfate, and lead(IV) sulfate, carbonates, such as lithium carbonate, magnesium carbonate, calcium carbonate, zinc carbonate, zirconium(IV) carbonate, iron(II) carbonate, and iron(III) carbonate, orthophosphates, such as lithium orthophosphate, calcium orthophosphate, zinc orthophosphate, magnesium orthophosphate, aluminum orthophosphate, tin(III) orthophosphate, iron(II) orthophosphate, and iron(III) orthophosphate, metaphosphates, such as lithium metaphosphate, calcium metaphosphate, and aluminum metaphosphate, pyrophosphates, such as magnesium pyrophosphate, calcium pyrophosphate, zinc pyrophosphate, iron(III) pyrophosphate, and tin(II) pyrophosphate, ammonium phosphates, such as magnesium ammonium phosphate, zinc ammonium phosphate, hydroxylapatite [$Ca_5\{(PO_4)_3OH\}$], orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, Optigel® SH and Optigel® EX 0482 (trademarks of Südchemie AG), Saponit® SKS-20 and Hektorit® SKS 21 (trademarks of Hoechst AG), and Laponite® RD and Laponite® GS (trademarks of Rockwood Holdings, Inc.), aluminates, such as lithium aluminate, calcium aluminate, and zinc aluminate, borates, such as magnesium metaborate and magnesium orthoborate, oxalates, such as calcium oxalate, zirconium(IV) oxalate, magnesium oxalate, zinc oxalate, and aluminum oxalate, tartrates, such as calcium tartrate, acetylacetonates, such as aluminum acetylacetonate and iron(III) acetylacetonate, salicylates, such as aluminum salicylate, citrates, such as calcium citrate, iron(II) citrate, and zinc citrate, palmitates, such as aluminum palmitate, calcium palmitate, and magnesium palmitate, stearates, such as aluminum stearate, calcium stearate, magnesium stearate, and zinc stearate, laurates, such as calcium laurate, linoleates, such as calcium linoleate, and oleates, such as calcium oleate, iron(II) oleate or zinc oleate.

As an essential semimetal compound which can be used in accordance with the invention, mention may be made of amorphous silicon dioxide and/or silicon dioxide present in different crystal structures. Silicon dioxide suitable in accordance with the invention is commercially available and can be obtained, for example, as Aerosil® (trademark of Evonik AG), Nalco® (trademark of Nalco), Levasil® (trademark of H.C. Starck GmbH), Ludox® (trademark of DuPont), Nyacol® and Bindzil® (trademarks of Akzo-Nobel), and Snowtex® (trademark of Nissan Chemical Industries, Ltd.). Nonmetal compounds suitable in accordance with the invention are, for example, colloidal graphite or diamond.

Particularly suitable finely divided inorganic solids are those whose solubility in water at 20° C. and atmospheric pressure (1 atm=1.013 bar (absolute)), >is ≦1 g/l, preferably ≦0.1 g/l and, more preferably, ≦0.01 g/l. Particular preference is given to compounds selected from the group comprising silicon dioxide, aluminum oxide, tin(IV) oxide, yttrium(III) oxide, cerium(IV) oxide, hydroxyaluminum oxide, calcium carbonate, magnesium carbonate, calcium orthophosphate, magnesium orthophosphate, calcium metaphosphate, magnesium metaphosphate, calcium pyrophosphate, magnesium pyrophosphate, orthosilicates, such as lithium orthosilicate, calcium/magnesium orthosilicate, aluminum orthosilicate, iron(II) orthosilicate, iron(III) orthosilicate, magnesium orthosilicate, zinc orthosilicate, zirconium(III) orthosilicate, and zirconium(IV) orthosilicate, metasilicates, such as lithium metasilicate, calcium/magnesium metasilicate, calcium metasilicate, magnesium metasilicate, and zinc metasilicate, phyllosilicates, such as sodium aluminum silicate and sodium magnesium silicate, especially in spontaneously delaminating form, such as, for example, products from the series including Nanofil®, Optigel®, Closite® (trademarks of Sudchemie AG), Somasif®, Lucentite® (trademarks of CBC Japan Co., Ltd), Saponit®, Hektorit® (trademarks of Hoechst AG) and Laponite® (trademark of Rockwood Holdings, Inc.), or iron(II) oxide, iron(III) oxide, iron(II/III) oxide, titanium dioxide, hydroxylapatite, zinc oxide, and zinc sulfide.

Preferably the at least one finely divided inorganic solid is selected from the group comprising silicon dioxide, phyllosilicates, aluminum oxide, hydroxyaluminum oxide, calcium carbonate, magnesium carbonate, calcium orthophosphate, magnesium orthophosphate, iron(II) oxide, iron(III) oxide, iron(II/III) oxide, tin(IV) oxide, cerium(IV) oxide, yttrium(III) oxide, titanium dioxide, hydroxylapatite, zinc oxide, and zinc sulfide.

Particular preference is given to silicon compounds, such as pyrogenic (fumed) silica, colloidal silica (silicon dioxide), and/or phyllosilicates.

In the process of the invention it is also possible to use with advantage the commercially available compounds of the Aerosil®, Levasil®, Ludox®, Nyacol®, Nalco®, and Bindzil® grades (silicon dioxide), Nanofil®, Optigel®, Somasif®, Cloisite®, Lucentite®, Saponit®, Hektorit®, and Laponite® grades (phyllosilicates), Disperal® grades (hydroxyaluminum oxide), Nyacol® AL grades (aluminum oxide), Hombitec® grades (titanium dioxide), Nyacol® SN grades (tin(IV) oxide), Nyacol® YTTRIA grades (yttrium(III) oxide), Nyacol® CEO2 grades (cerium(IV) oxide), and Sachtotec® grades (zinc oxide).

The finely divided inorganic solids which can be used to prepare the composite particles have particles which, dispersed in the aqueous polymerization medium, have a particle diameter of 100 nm. Finely divided inorganic solids used successfully are those whose dispersed particles have a particle diameter >0 nm but ≦90 nm, ≦80 nm, ≦70 nm, ≦60 nm, ≦50 nm, ≦40 nm, ≦30 nm, ≦20 nm or ≦10 nm and all values in between. With advantage, finely divided inorganic solids are used which have a particle diameter ≦50 nm.

The particle size of the finely divided inorganic solid and also of the composite particles obtainable by the process of the invention is determined, for the purposes of this specification, generally by the method of quasielastic light scattering (DIN ISO 13321) using a High Performance Particle Sizer (HPPS) from Malvern Instruments Ltd.

The obtainability of finely divided solids is known in principle to the skilled worker and they are obtained, for example, by precipitation reactions or chemical reactions in the gas phase (on this point cf. E. Matijevic, Chem. Mater. 5 (1993) pages 412 to 426; Ullmann's Encyclopedia of Industrial Chemistry, Vol. A 23, pages 583 to 660, Verlag Chemie, Weinheim, 1992; D. F. Evans, H. Wennerström in The Colloidal Domain, pages 363 to 405, Verlag Chemie, Weinheim, 1994, and R. J. Hunter in Foundations of Colloid Science, Vol. I, pages 10 to 17, Clarendon Press, Oxford, 1991).

These finely divided inorganic solids can be used in accordance with the invention either in the form of powders or in the form of stable aqueous dispersions of solids, referred to as sols.

The aqueous dispersions of solids are often prepared directly during synthesis of the finely divided inorganic solids in aqueous medium or else by dispersing the finely divided inorganic solid into the aqueous medium. Depending on the way in which said finely divided inorganic solids are prepared, this is done either directly, in the case, for example, of precipitated or pyrogenic silicon dioxide, aluminum oxide, etc., or by using appropriate auxiliary devices, such as dispersers or ultrasound sonotrodes, for example. The aqueous dispersions of solids are, frequently, stable aqueous dispersions of solids.

Stable aqueous dispersions of solids are understood here to mean those aqueous dispersions of solids which, at an initial solids concentration of $\geq 0.1\%$ by weight, based on the aqueous dispersion of solids, still comprise in dispersed form one hour after their preparation or after homogeneous dispersing of the sedimented finely divided solids, without further energy input (such as stirring or shaking), more than 90% by weight of the originally dispersed solid.

The quantitative determination of the initial solids concentration and of the solids concentration after one hour takes place for the purposes of this specification by the method of analytical ultracentrifugation (cf. on this point S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell AUC Multiplexer: High Resolution Particle Size Distribution and Density Gradient Techniques, W. Mächtle, pages 147 to 175).

According to the invention, use is made of 1 to 1000%, advantageously 1 to 100%, and with particular advantage 2 to 70%, by weight of the inorganic solid, based on the total monomer amount.

In step b) of the process of the invention at least a portion, often $\geq 10\%$, $\geq 20\%$, $\geq 30\%$ or $\geq 40\%$ by weight, and advantageously $\geq 50\%$, $\geq 60\%$, $\geq 70\%$, $\geq 80\%$ or $\geq 90\%$ by weight, of the total amount of the inorganic solid is included in the initial charge in the aqueous polymerization medium, with formation of an aqueous dispersion of solids. Any remainder of inorganic solid is metered into the aqueous polymerization medium in step d) of the process under polymerization conditions, discontinuously in one or more portions or continuously at a constant or a varying volume flow rate, more particularly in the form of an aqueous solids dispersion. With advantage, however, in step b) of the invention, the total amount of the inorganic solid in the aqueous polymerization medium is included, in the form of an aqueous solids dispersion, in the initial charge. Where the inorganic solid is used in powder form, it may be advantageous to disperse the finely divided powder solid with assistance from suitable auxiliary assemblies, such as stirrers, dispersers or ultrasound sonotrodes, for example, in the aqueous polymerization medium.

For preparing the aqueous composite-particle dispersions, dispersants used are generally those which maintain not only the finely divided inorganic solid particles but also the monomer droplets and the resulting composite particles in disperse distribution in the aqueous polymerization medium and so ensure the stability of the aqueous dispersions of composite particles that are produced. Suitable dispersants include both the protective colloids commonly used to carry out free-radical aqueous emulsion polymerizations, and emulsifiers.

An exhaustive description of suitable protective colloids is given in Houben-Weyl, Methoden der organischen Chemie, Volume XIV/1, Makromolekulare Stoffe [Macromolecular compounds], Georg-Thieme-Verlag, Stuttgart, 1961, pages 411 to 420.

Examples of suitable neutral protective colloids are polyvinyl alcohols, polyalkylene glycols, cellulose derivatives, starch derivatives, and gelatin derivatives.

Suitable anionic protective colloids, i.e., protective colloids whose dispersive component has at least one negative electrical charge, are for example polyacrylic acids and polymethacrylic acids and their alkali metal salts, copolymers comprising acrylic acid, methacrylic acid, 2-acrylamido-2-methylpropanesulfonic acid, 4-styrenesulfonic acid and/or maleic anhydride, and the alkali metal salts of such copolymers, and also alkali metal salts of sulfonic acids of high molecular mass compounds such as, for example, polystyrene.

Suitable cationic protective colloids, i.e., protective colloids whose dispersive component has at least one positive electrical charge, are, for example, the N-protonated and/or N-alkylated derivatives of homopolymers and copolymers comprising N-vinylpyrrolidone, N-vinylcaprolactam, N-vinylcarbazole, 1-vinylimidazole, 2-vinylimidazole, 2-vinylpyridine, 4-vinylpyridine, acrylamide, methacrylamide, amino-functional acrylates, methacrylates, acrylamides and/or methacrylamides.

It is of course also possible to use mixtures of emulsifiers and/or protective colloids. As dispersants it is common to use exclusively emulsifiers, whose relative molecular weights, unlike those of the protective colloids, are usually below 1500 g/mol. Where mixtures of surface-active substances are used the individual components must of course be compatible with one another, which in case of doubt can be checked by means of a few preliminary experiments. An overview of suitable emulsifiers is given in Houben-Weyl, Methoden der organischen Chemie, Volume XIV/1, Makromolekulare Stoffe [Macromolecular compounds], Georg-Thieme-Verlag, Stuttgart, 1961, pages 192 to 208.

Customary nonionic emulsifiers are for example ethoxylated mono-, di- and tri-alkylphenols (EO units: 3 to 50, alkyl: $C_4$ to $C_{12}$) and ethoxylated fatty alcohols (EO units: 3 to 80; alkyl: $C_8$ to $C_{36}$). Examples thereof are the Lutensol® A grades ($C_{12}C_{14}$ fatty alcohol ethoxylates, EO units: 3 to 8), Lutensol® AO grades ($C_{13}C_{15}$ oxo alcohol ethoxylates, EO units: 3 to 30), Lutensol® AT grades ($C_{16}C_{18}$ fatty alcohol ethoxylates, EO units: 11 to 80), Lutensol® ON grades ($C_{10}$ oxo alcohol ethoxylates, EO units: 3 to 11), and the Lutensol® TO grades ($C_{13}$ oxo alcohol ethoxylates, EO units: 3 to 20) from BASF AG.

Customary anionic emulsifiers are, for example, alkali metal salts and ammonium salts of alkyl sulfates (alkyl: $C_8$ to $C_{12}$), of sulfuric monoesters with ethoxylated alkanols (EO units: 4 to 30, alkyl: $C_{12}$ to $C_{18}$) and with ethoxylated alkylphenols (EO units: 3 to 50, alkyl: $C_4$ to $C_{12}$), of alkylsulfonic acids (alkyl: $C_{12}$ to $C_{18}$) and of alkylarylsulfonic acids (alkyl: $C_9$ to $C_{18}$).

Compounds which have proven suitable as further anionic emulsifiers are, furthermore, compounds of the general formula I

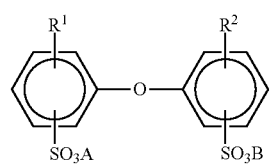

(I)

in which $R^1$ and $R^2$ are hydrogens or $C_4$ to $C_{24}$ alkyl but are not both simultaneously hydrogens and A and B can be alkali metal ions and/or ammonium ions. In the general formula I, $R^1$ and $R^2$ are preferably linear or branched alkyl radicals of 6 to 18 carbons, especially 6, 12 and 16 carbons, or —H, $R^1$ and $R^2$ not both being hydrogens simultaneously. A and B are preferably sodium, potassium or ammonium, particular preference being given to sodium. Particularly advantageous compounds I are those in which A and B are sodium, $R^1$ is a branched alkyl radical of 12 carbons, and $R^2$ is a hydrogen or $R^1$. Frequently, use is made of technical-grade mixtures containing a fraction of from 50 to 90% by weight of the monoalkylated product; for example, Dowfax® 2A1 (trademark of Dow Chemical Company). The compounds I are widely known, from U.S. Pat. No. 4,269,749, for example, and are obtainable commercially.

Suitable cation-active emulsifiers are generally $C_6$-$C_{18}$alkyl, aralkyl or heterocyclyl-containing primary, secondary, tertiary or quaternary ammonium salts, alkanol-ammonium salts, pyridinium salts, imidazolinium salts, oxazolinium salts, morpholinium salts, thiazolinium salts, and salts of amine oxides, quinolinium salts, isoquinolinium salts, tropylium salts, sulfonium salts, and phosphonium salts. Examples that may be mentioned include dodecylammonium acetate or the corresponding hydrochloride, the chlorides or acetates of the various paraffinic acid 2-(N,N,N-trimethylammonium ethyl esters, N-cetylpyridinium chloride, N-laurylpyridinium sulfate, and also N-cetyl-N,N,N-trimethylammonium bromide, N-dodecyl-N,N,N-trimethylammonium bromide, N-octyl-N,N,N-trimethylammonium bromide, N,N-distearyl-N,N-dimethylammonium chloride, and the gemini surfactant N,N'-(lauryldimethyl)ethylenediamine dibromide. Many further examples can be found in H. Stache, Tensid-Taschenbuch, Carl-Hanser-Verlag, Munich, Vienna, 1981, and in McCutcheon's, Emulsifiers & Detergents, MC Publishing Company, Glen Rock, 1989.

Frequently used for preparing the aqueous composite-particle dispersions is $\geq 0.1\%$ and $\leq 10\%$, often $\geq 0.25\%$ and $\leq 7.0\%$ and frequently $\geq 0.5\%$ and $\leq 5.0\%$ by weight of dispersant, based in each case on the total monomer amount. Preference is given to using emulsifiers, especially nonionic and/or anionic emulsifiers. With particular advantage anionic emulsifiers are used.

In accordance with the invention it is possible if appropriate to include a portion or the entirety of dispersant in the initial charge in the polymerization vessel, as a constituent of the aqueous polymerization medium comprising a portion or the entirety of the inorganic solid [process step b)]. Alternatively it is possible to supply the entirety or any remainder of dispersant to the aqueous polymerization medium during step c) and/or d) of the process. The entirety or any remainder of dispersant can in that case be metered into the aqueous polymerization medium discontinuously, in one or more portions, or continuously, with the same or changing volume flow rates. With particular advantage at least a portion of dispersing assistant is included in the initial charge in step b) of the process. Where the ethylenically unsaturated monomers are metered in in step c) and/or d) of the process in the form of an aqueous monomer emulsion, portions of dispersing assistant are used during step c) and/or d) of the process, more particularly as part of an aqueous monomer emulsion.

Suitable ethylenically unsaturated monomers in accordance with the invention include all those which are easy to polymerize free-radically in aqueous medium and which are familiar to the skilled worker in accordance with the method of aqueous emulsion polymerization. They include ethylene, vinylaromatic monomers, such as styrene, α-methylstyrene, o-chlorostyrene or vinyltoluenes, esters of vinyl alcohol and $C_1$-$C_{18}$ monocarboxylic acids, such as vinyl acetate, vinyl propionate, vinyl n-butyrate, vinyl laurate and vinyl stearate, esters of preferably $C_3$-$C_6$ α,β-monoethylenically unsaturated mono- and dicarboxylic acids, such as especially acrylic acid, methacrylic acid, maleic acid, fumaric acid and itaconic acid, with generally $C_1$-$C_{12}$, preferably $C_1$-$C_8$ and, in particular, $C_1$-$C_4$ alkanols, such as, in particular, methyl, ethyl, n-butyl, isobutyl and 2-ethylhexyl acrylate and methacrylate, dimethyl maleate and di-n-butyl maleate, nitriles of α,β-monoethylenically unsaturated carboxylic acids, such as acrylonitrile, and $C_{4-5}$ conjugated dienes, such as 1,3-butadiene and isoprene. These monomers generally constitute the principal monomers, which, based on the overall monomer amount, normally account for a proportion of $\geq 50\%$, $\geq 80\%$ or $\geq 90\%$ by weight. As a general rule, these monomers are only of moderate to poor solubility in water at 25° C. and atmospheric pressure (1 atm (absolute)), i.e. $\leq 10$ g, preferably $\leq 5$ g, and more preferably $\leq 2$ g per 100 g of deionized water.

Further monomers, which customarily increase the internal strength of the films of the polymer matrix normally contain at least one epoxy, hydroxyl, N-methylol or carbonyl group or at least two nonconjugated ethylenically unsaturated double bonds. Examples here are monomers having two vinyl radicals, monomers having two vinylidene radicals, and monomers having two alkenyl radicals. Particularly advantageous in this context are the diesters of dihydric alcohols with α,β-monoethylenically unsaturated monocarboxylic acids, among which acrylic and methacrylic acid are preferred. Examples of this kind of monomer having two nonconjugated ethylenically unsaturated double bonds are alkylene glycol diacrylates and dimethacrylates such as ethylene glycol diacrylate, 1,2-propylene glycol diacrylate, 1,3-propylene glycol diacrylate, 1,3-butylene glycol diacrylate, 1,4-butylene glycol diacrylates and ethylene glycol dimethacrylate, 1,2-propylene glycol dimethacrylate, 1,3-propylene glycol dimethacrylate, 1,3-butylene glycol dimethacrylate, 1,4-butylene glycol dimethacrylate, and also glycidyl acrylate, glycidyl methacrylate, divinylbenzene, vinyl methacrylate, vinyl acrylate, allyl methacrylate, allyl acrylate, diallyl maleate, diallyl fumarate, methylenebisacrylamide, cyclopentadienyl acrylate, triallyl cyanurate, and triallyl isocyanurate. Of particular importance in this context are also the methacrylic and acrylic $C_1$-$C_8$ hydroxyalkyl esters, such as n-hydroxyethyl, n-hydroxypropyl or n-hydroxybutyl acrylate and methacrylate, and compounds such as diacetoneacrylamide and acetylacetoxyethyl acrylate and methacrylate. In accordance with the invention, the aforementioned monomers are used in amounts of 5%, frequently $\leq 0.1\%$ and $\leq 3\%$, and often $\geq 0.5\%$ and $\leq 2\%$ by weight, in each case based on the total monomer amount, for the polymerization.

Besides these, it is possible additionally to use as monomers those ethylenically unsaturated monomers S which either comprise at least one acid group and/or its corresponding anion or those ethylenically unsaturated monomers A which comprise at least one amino, amido, ureido or N-heterocyclic group and/or the N-protonated or N-alkylated ammonium derivatives thereof. Based on the total monomer amount, the amount of monomers S or monomers A, respectively, is $\leq 10\%$ by weight, often $\geq 0.1\%$ and $\leq 7\%$ by weight, and frequently $\geq 0.2\%$ and $\leq 5\%$ by weight.

Monomers S used are ethylenically unsaturated monomers containing at least one acid group. The acid group may, for example, be a carboxylic, sulfonic, sulfuric, phosphoric and/or phosphonic acid group. Examples of such monomers S are acrylic acid, methacrylic acid, maleic acid, fumaric acid, itaconic acid, crotonic acid, 4-styrene-sulfonic acid, 2-methacryloyloxyethylsulfonic acid, 2-acrylamido-2-methylpropane-sulfonic acid, vinylsulfonic acid, and vinylphosphonic acid, and also phosphoric monoesters of n-hydroxyalkylacrylates and n-hydroxyalkyl methacrylates, such as phosphoric monoesters of hydroxyethyl acrylate, n-hydroxypropyl acrylate, n-hydroxy-butyl acrylate and hydroxyethyl methacrylate, n-hydroxypropyl methacrylate or n-hydroxybutyl methacrylate, for example. In accordance with the invention, however, it is also possible to use the ammonium and alkali metal salts of the aforementioned ethylenically unsaturated monomers containing at least one acid group. Particularly preferred alkali metals are sodium and potassium. Examples of such compounds are the ammonium, sodium, and potassium salts of acrylic acid, methacrylic acid, maleic acid, fumaric acid, itaconic acid, crotonic acid, 4-styrenesulfonic acid, 2-methacryloyl-oxyethylsulfonic acid, 2-acrylamido-2-methylpropanesulfonic acid, vinylsulfonic acid, and vinylphosphonic acid, and also the mono- and di-ammonium, -sodium and -potassium salts of the phosphoric monoesters of hydroxyethyl acrylate, n-hydroxy-propyl acrylate, n-hydroxybutyl acrylate and hydroxyethyl methacrylate, n-hydroxy-propyl methacrylate or n-hydroxybutyl methacrylate.

Preference is given to using acrylic acid, methacrylic acid, maleic acid, fumaric acid, itaconic acid, crotonic acid, 4-styrenesulfonic acid, 2-methacryloyloxyethylsulfonic acid, vinylsulfonic acid, and vinylphosphonic acid as monomers S.

As monomers A, use is made of ethylenically unsaturated monomers which comprise at least one amino, amido, ureido or N-heterocyclic group and/or the N-protonated or N-alkylated ammonium derivatives thereof.

Examples of monomers A which comprise at least one amino group are 2-aminoethyl acrylate, 2-aminoethyl methacrylate, 3-aminopropyl acrylate, 3-aminopropyl methacrylate, 4-amino-n-butyl acrylate, 4-amino-n-butyl methacrylate, 2-(N-methyl-amino)ethyl acrylate, 2-(N-methylamino)ethyl methacrylate, 2-(N-ethylamino)ethyl acrylate, 2-(N-ethylamino)ethyl methacrylate, 2-(N-n-propylamino)ethyl acrylate, 2-(N-n-propylamino)ethyl methacrylate, 2-(N-iso-propylamino)ethyl acrylate, 2-(N-iso-propylamino)ethyl methacrylate, 2-(N-tert-butylamino)ethyl acrylate, 2-(N-tert-butylamino)ethyl methacrylate (available commercially, for example, as Norsocryl® TBAEMA from Arkema Inc.), 2-(N,N-dimethylamino)ethyl acrylate (available commercially, for example, as Norsocryl® ADAME from Arkema Inc.), 2-(N,N-dimethyl-amino)ethyl methacrylate (available commercially, for example, as Norsocryl® MADAME from Arkema Inc.), 2-(N,N-diethylamino)ethyl acrylate, 2-(N,N-diethylamino)ethyl methacrylate, 2-(N,N-di-n-propylamino)ethyl acrylate, 2-(N,N-di-n-propylamino)ethyl methacrylate, 2-(N,N-di-iso-propylamino)ethyl acrylate, 2-(N,N-di-iso-propylamino)ethyl methacrylate, 3-(N-methylamino)propyl acrylate, 3-(N-methyl-amino)propyl methacrylate, 3-(N-ethylamino)propyl acrylate, 3-(N-ethylamino)propyl methacrylate, 3-(N-n-propylamino)propyl acrylate, 3-(N-n-propylamino)propyl methacrylate, 3-(N-iso-propylamino)propyl acrylate, 3-(N-iso-propylamino)propyl methacrylate, 3-(N-tert-butylamino)propyl acrylate, 3-(N-tert-butylamino)propyl methacrylate, 3-(N,N-dimethylamino)propyl acrylate, 3-(N,N-dimethylamino)propyl methacrylate, 3-(N,N-diethylamino)propyl acrylate, 3-(N,N-diethylamino)propyl methacrylate, 3-(N,N-di-n-propylamino)propyl acrylate, 3-(N,N-di-n-propylamino)propyl methacrylate, 3-(N,N-di-iso-propylamino)propyl acrylate, and 3-(N,N-di-iso-propylamino)propyl methacrylate.

Examples of monomers A which comprise at least one amido group are acrylamide, methacrylamide, N-methylacrylamide, N-methylmethacrylamide, N-ethylacrylamide, N-ethylmethacrylamide, N-n-propylacrylamide, N-n-propylmethacrylamide, N-iso-propylacrylamide, N-iso-propylmethacrylamide, N-tert-butylacrylamide, N-tert-butylmethacrylamide, N,N-dimethylacrylamide, N,N-dimethylmethacrylamide, N,N-diethylacrylamide, N,N-diethylmethacrylamide, N,N-di-n-propylacrylamide, N,N-di-n-propylmethacrylamide, N,N-di-iso-propylacrylamide, N,N-di-iso-propylmethacrylamide, N,N-di-n-butylacrylamide, N,N-di-n-butylmethacrylamide, N-(3-N',N'-dimethylamino-propyl)methacrylamide, diacetoneacrylamide, N,N'-methylenebisacrylamide, N-(diphenylmethyl)acrylamide, N-cyclohexylacrylamide, and also N-vinylpyrrolidone and N-vinylcaprolactam.

Examples of monomers A which comprise at least one ureido group are N,N'-divinyl-ethyleneurea and 2-(1-imidazolin-2-onyl)ethyl methacrylate (available commercially, for example, as Norsocryl® 100 from Arkema Inc.).

Examples of monomers A which comprise at least one N-heterocyclic group are 2-vinylpyridine, 4-vinylpyridine, 1-vinylimidazole, 2-vinylimidazole, and N-vinyl-carbazole.

Preference is given to using as monomers A the following compounds: 2-vinylpyridine, 4-vinylpyridine, 2-vinylimidazole, 2-(N,N-dimethylamino)ethyl acrylate, 2-(N,N-dimethylamino)ethyl methacrylate, 2-(N,N-diethylamino)ethyl acrylate, 2-(N,N-diethylamino)ethyl methacrylate, 2-(N-tert-butylamino)ethyl methacrylate, N-(3-N',N'-dimethylamino-propyl)methacrylamide, and 2-(1-imidazolin-2-onyl)ethyl methacrylate.

Depending on the pH of the aqueous reaction medium, it is possible for some or all of the aforementioned nitrogen-containing monomers A to be present in the N-protonated quaternary ammonium form.

Examples that may be mentioned as monomers A which have a quaternary alkylammonium structure on the nitrogen include 2-(N,N,N-trimethylammonium)ethyl acrylate chloride (available commercially, for example, as Norsocryl® ADAMQUAT MC 80 from Arkema Inc.), 2-(N,N,N-trimethylammonium)ethyl methacrylate chloride (available commercially, for example, as Norsocryl® MADQUAT MC 75 from Arkema Inc.), 2-(N-methyl-N,N-diethylammonium) ethyl acrylate chloride, 2-(N-methyl-N,N-diethylammonium)ethyl methacrylate chloride, 2-(N-methyl-N,N-dipropylammonium)-ethyl acrylate chloride, 2-(N-methyl-N,N-dipropylammonium)ethyl methacrylate, 2-(N-benzyl-N,N-dimethylammonium)ethyl acrylate chloride (available commercially, for example, as Norsocryl® ADAMQUAT BZ 80 from Arkema Inc.), 2-(N-benzyl-N,N-dimethylammonium)ethyl methacrylate chloride (available commercially, for example, as Norsocryl® MADQUAT BZ 75 from Elf Atochem), 2-(N-benzyl-N,N-diethyl-ammonium)ethyl acrylate chloride, 2-(N-benzyl-N,N-diethylammonium)ethyl methacrylate chloride, 2-(N-benzyl-N,N-dipropylammonium)ethyl acrylate chloride, 2-(N-benzyl-N,N-dipropylammonium)ethyl methacrylate chloride, 3-(N,N,N-trimethylammonium)propyl acrylate chloride, 3-(N,N,N-trimethylammonium)propyl methacrylate chloride, 3-(N-methyl-N,N-diethylammonium)propyl acrylate chloride, 3-(N-methyl-N,N-diethylammonium)propyl methacrylate chloride, 3-(N-methyl-N,N-dipropylammonium)propyl acrylate chloride, 3-(N-methyl-N,N-dipropylammonium)-propyl methacrylate chloride, 3-(N-benzyl-N,N-dimethylammonium)propyl acrylate chloride, 3-(N-benzyl-N,N-dimethylammonium)propyl methacrylate chloride, 3-(N-benzyl-N,N-diethylammonium)propyl acrylate chloride, 3-(N-benzyl-N,N-diethyl-ammonium)propyl methacrylate chloride, 3-(N-benzyl-N,N-dipropylammonium)propyl acrylate chloride, and 3-(N-benzyl-N,N-dipropylammonium) propyl methacrylate chloride. It is of course also possible to use the corresponding bromides and sulfates instead of the chlorides named.

Preference is given to using 2-(N,N,N-trimethylammonium)ethyl acrylate chloride, 2-(N,N,N-trimethylammonium)ethyl methacrylate chloride, 2-(N-benzyl-N,N-dimethyl-ammonium)ethyl acrylate chloride, and 2-(N-benzyl-N,N-dimethylammonium)ethyl methacrylate chloride.

It is of course also possible to use mixtures of the aforementioned ethylenically unsaturated monomers S and/or A.

It can frequently be advantageous to additionally use, besides the above-mentioned monomers, ethylenically unsaturated monomers which contain at least one silicon functional group (silane monomer), such as, for example, vinylalkoxysilanes, such as more particularly vinyltrimethoxysilane, vinyltriethoxysilane, vinyltriisopropoxysilane, vinyltriphenoxysilane, vinyltris(dimethylsiloxy)silane, vinyltris(2-methoxyethoxy)silane, vinyltris(3-methoxypropoxy)silane and/or vinyltris(trimethylsiloxy)silane, acryloyloxy-silanes, such as more particularly 2-(acryloyloxyethoxy)trimethylsilane, acryloyloxy-methyltrimethylsilane, (3-acryloyloxypropyl)dimethylmethoxysilane, (3-acryloyloxy-propyl)methylbis(trimethylsiloxy)silane, (3-acryloyloxypropyl)methyldimethoxysilane, (3-acryloyloxypropyl)trimethoxysilane and/or (3-acryloyloxypropyl)tris(trimethylsiloxy)silane, methacryloyloxysilanes, such as more particularly (3-methacryloyloxypropyl)trimethoxysilane, (3-methacryloyloxypropyl)-methyldimethoxysilane, (3-methacryloyloxypropyl)dimethylmethoxysilane, (3-methacryloyloxypropyl)triethoxysilane, (methacryloyloxymethyl)methyldiethoxysilane and/or (3-methacryloyloxypropyl)methyldiethyloxysilane. With particular advantage in accordance with the invention use is made of acryloyloxysilanes and/or methacryloyl-oxysilanes, more particularly methacryloyloxysilanes, such as preferably (3-meth-acryloyloxypropyl)trimethoxysilane, (3-methacryloyloxypropyl)methyldimethoxysilane, (3-methacryloyloxypropyl)dimethylmethoxysilane, (3-methacryloyloxypropyl)-triethoxysilane, (methacryloyloxymethyl)methyldiethoxysilane and/or (3-methacryloyl-oxypropyl)methyldiethoxysilane. The amount of silane monomers is $\geq 0.01\%$ and $\leq 10\%$ by weight, advantageously $\geq 0.1\%$ and $\leq 5\%$ by weight, and with particular advantage $\geq 0.1\%$ and $\leq 2\%$ by weight, based in each case on the total monomer amount.

With advantage, in step c) of the process, $\geq 1\%$ and $\leq 15\%$ by weight, and with particular advantage $\geq 5\%$ and $\leq 15\%$ by weight, of the total monomer amount is metered in.

All of the aforementioned ethylenically unsaturated monomers may be metered in as separate individual streams or in a mixture, discontinuously in one or more portions, or continuously with constant or changing volume flow rates, in stages c) and/or d) of the process. The ethylenically unsaturated monomers may be added without solvent, in the form of a solvent-free or solvent-containing monomer mixture, or, advantageously, in the form of an aqueous monomer emulsion. It will be appreciated that the process of the invention also embraces the wide variety of monomer feed procedures that are familiar to the skilled worker, such as a core/shell procedure or gradient procedure, for example.

With particular advantage the composition of the ethylenically unsaturated monomers is chosen such that the resulting addition polymer has a glass transition temperature $\geq -60°$ C. and $\leq 130°$ C., preferably $\leq 60°$ C., more preferably $\leq 40°$ C., and frequently $\geq -50°$ C. and often $\geq -40°$ C. or $\geq -30°$ C.

The glass transition temperature is normally determined in accordance with DIN 53 765 (Differential Scanning calorimetry, 20 K/min, midpoint measurement).

According to Fox (T. G. Fox, Bull. Am. Phys. Soc. 1956 [Ser. II] 1, page 123, and in accordance with Ullmann's Encyclopädie der technischen Chemie, Vol. 19, page 18, 4th edition, Verlag Chemie, Weinheim, 1980) it is the case that for the glass transition temperature $T_g$ of copolymers with no more than low degrees of crosslinking, in good approximation:

$$1/T_g = x^1/T_g^1 + x^2/T_g^2 + \ldots x^n/T_g^n,$$

where $x^1, x^2, \ldots x^n$ are the mass fractions of the monomers 1, 2, ... n and $T_g^1, T_g^2, \ldots T_g^n$ are the glass transition temperatures of the addition polymers synthesized in each case only from one of the monomers 1, 2, ... n, in degrees Kelvin. The $T_g$ values for the homopolymers of the majority of monomers are known and are listed for example in Ullmann's Encyclopedia of Industrial Chemistry, 5th ed., Vol. A21, page 169, Verlag Chemie, Weinheim, 1992; further sources of homopolymer glass transition temperatures are formed, for example, by J. Brandrup, E. H. Immergut, Polymer Handbook, 1$^{st}$ Ed., J. Wiley, New York, 1966; 2$^{nd}$ Ed. J. Wiley, New York, 1975 and 3$^{rd}$ Ed. J. Wiley, New York, 1989.

Initiators suitable for the initiation of the free-radical polymerization include all those free-radical polymerization initiators (free-radical initiators) capable of triggering a free-radical aqueous emulsion polymerization. The initiators can in principle comprise both peroxides and azo compounds. Redox initiator systems are also suitable, of course. Peroxides used can in principle be inorganic peroxides, such as hydrogen peroxide or peroxodisulfates, such as the mono- or di-alkali metal salts or ammonium salts of peroxodisulfuric acid, examples being the mono- and di-sodium and -potassium salts, or ammonium salts, thereof, or else organic peroxides, such as alkyl hydroperoxides, examples being tert-butyl, p-mentyl and cumyl hydroperoxide, and also dialkyl or diaryl peroxides, such as di-tert-butyl peroxide or dicumyl peroxide. Azo compounds used are primarily 2,2'-azobis(isobutyronitrile), 2,2'-azobis(2,4-dimethylvaleronitrile), and 2,2'-azobis(amidinopropyl) dihydrochloride (AIBA, corresponding to V-50 from Wako Chemicals). Suitable oxidizing agents for redox initiator systems are essentially the abovementioned peroxides. Corresponding reducing agents used can be compounds of sulfur with a low oxidation state, such as alkali metal sulfites, e.g., potassium and/or sodium sulfite, alkali metal hydrogen sulfites, e.g., potassium and/or sodium hydrogen sulfite, alkali metal metabisulfites, e.g., potassium and/or sodium metabisulfite, formaldehyde-sulfoxylates, e.g., potassium and/or sodium formaldehyde-sulfoxylate, alkali metal salts, especially potassium salts and/or sodium salts, of aliphatic sulfinic acids, and alkali metal hydrogen sulfides, e.g., potassium and/or sodium hydrogen sulfide, salts of polyvalent metals, such as iron(II) sulfate, iron(II) ammonium sulfate, iron(II) phosphate, enediols, such as dihydroxymaleic acid, benzoin and/or ascorbic acid, and reducing saccharides, such as sorbose, glucose, fructose and/or dihydroxyacetone. Where redox initiator systems are used in accordance with the invention, the oxidizing agents and the reducing agents are frequently metered in in parallel, or, preferably, the entirety of the corresponding oxidizing agent is included in the initial charge and only the reducing agent is metered in. In the case of redox initiator systems, the total amount of free-radical initiator is formed from the total amounts of oxidizing agents and reducing agents. As free-radical initiators, however, it is preferred to use organic and inorganic peroxides, and especially inorganic peroxides, frequently in the form of aqueous solutions. More particularly preferred as free-radical initiator are sodium peroxodisulfate, potassium peroxodisulphate, ammonium peroxo-disulfate, hydrogen peroxide and/or tert-butyl hydroperoxide.

In accordance with the invention the amount of free-radical initiator used in total is 0.05% to 2% by weight, advantageously 0.1% to 1.5% by weight, and with particular advantage 0.3% to 1.0% by weight, based in each case on the total monomer amount.

It is essential to the invention that in stage c) of the process a total of $\geq 0.01\%$ and $\leq 20\%$ by weight of the total monomer amount and $\geq 60\%$, preferably $\geq 70\%$, and also $\leq 90\%$ or $\leq 100\%$, by weight, and with particular preference $\geq 75\%$ and $\leq 85\%$ by weight, of the total amount of free-radical polymerization initiator is metered into the aqueous dispersion of solids, and the metered ethylenically unsaturated monomers are polymerized under polymerization conditions to a monomer conversion of $\geq 80\%$, preferably $\geq 85\%$, and with particular preference $\geq 90\%$, by weight.

The addition of the free-radical initiator to the aqueous polymerization medium in step c) of the process can take place under polymerization conditions. An alternative possibility is to add a portion or the entirety of the free-radical initiator to the aqueous polymerization medium comprising the monomers included in the initial charge, under conditions which are not suitable to initiate a polymerization reaction, at low temperature for example, and thereafter to set polymerization conditions in the aqueous polymerization mixture.

In stage c) of the process the free-radical initiator or its components may be added discontinuously in one or more portions, or continuously with constant or changing volume flow rates.

The determination of the monomer conversion is familiar in principle to the skilled worker and is accomplished, for example, by reaction-calorimetry determinations.

When, in step c) of the process, the amount of monomers used has been polymerized to a conversion of $\geq 80\%$ by weight (polymerization stage 1), in the subsequent step d) of the process any remainder, i.e., $\leq 90\%$, $\leq 80\%$, $\leq 70\%$, $\leq 60\%$ by weight, and advantageously $\leq 50\%$, $\leq 40\%$, $\leq 30\%$, $\leq 20\%$ or $\leq 10\%$ by weight, of the inorganic solid, any remainder, i.e., $\leq 40\%$, $\leq 30\%$ or, preferably, $\geq 15\%$ and $\leq 25\%$ by weight, of the free-radical polymerization initiator, and the remainder, i.e., $\geq 80\%$ and $\leq 99.99\%$ by weight, preferably $\geq 85\%$ and $\leq 99\%$ by weight, and, with particular preference, $\geq 85\%$ and $\leq 95\%$ by weight of the ethylenically unsaturated monomers is metered in under polymerization conditions and polymerized to a monomer conversion $\geq 90\%$ by weight (polymerization stage 2). In this context it is also possible in step d) of the process for the respective components to be metered in as separate individual streams or in a mixture, discontinuously in one or more portions or continuously with constant or varying volume flow rates. It will be appreciated that it is also possible for the free-radical initiators or ethylenically unsaturated monomers to differ in steps c) and d) of the process.

By polymerization conditions here in the context of this specification are meant, generally, those temperatures and pressures under which the free-radically initiated aqueous emulsion polymerization proceeds with a sufficient polymerization rate. They are dependent more particularly on the free-radical initiator that is used. Advantageously the nature and amount of the free-radical initiator, the polymerization temperature, and the polymerization pressure are selected in steps c) and d) of the process such that the free-radical initiator used has an adequate half-life, while at the same time always providing starting free radicals sufficient to initiate and maintain the polymerization reaction.

In steps c) and d) of the process suitable reaction temperatures for the free-radical aqueous emulsion polymerization reaction in the presence of the finely divided inorganic solid embrace the entire range from 0 to 170° C. In general, the temperatures used are from 50 to 120° C., frequently 60 to 110° C. and often 70 to 100° C. The free-radical aqueous emulsion polymerization can be conducted at a pressure less than, equal to or greater than atmospheric pressure, and the polymerization temperature may exceed 100° C. and can be up to 170° C. Polymerization is preferably carried out in the presence of highly volatile monomers B, such as ethylene, butadiene or vinyl chloride, under increased pressure. In this case the pressure can adopt values of 1.2, 1.5, 2, 5, 10 or 15 bar or even higher. When emulsion polymerizations are conducted under subatmospheric pressure, pressures of 950 mbar, frequently 900 mbar and often 850 mbar (absolute) are established. The free-radical aqueous emulsion polymerization is advantageously conducted at atmospheric pressure (for example, in the laboratory) or superatmospheric pressure (for example, on the industrial scale) in the absence of oxygen, more particularly under an inert gas atmosphere, such as under nitrogen or argon, for example.

It is important for the process of the invention that, to a minor extent, readily water-soluble organic solvents, such as methanol, ethanol, isopropanol, butanols, but also acetone, etc., for example, may in principle also be added to the aqueous polymerization medium. It is important, however, that the amount of organic solvent added is such that at the end of step d) of the process it is $\leq 10\%$, advantageously $\leq 5\%$, and with particular advantage $\leq 2\%$ by weight, based in each case on the total amount of water in the aqueous composite-particle dispersion obtainable in accordance with the invention. In accordance with the invention, advantageously, no such solvents at all are added.

Besides the abovementioned components it is also possible, optionally, in the process of the invention for preparing the aqueous composite-particle dispersion, to use free-radical chain transfer compounds in order to reduce or control the molecular weight of the addition polymers obtainable by the polymerization. Suitable compounds of this type include, essentially, aliphatic and/or araliphatic halogen compounds, such as n-butyl chloride, n-butyl bromide, n-butyl iodide, methylene chloride, ethylene dichloride, chloroform, bromoform, bromotrichloromethane, dibromodichloromethane, carbon tetrachloride, carbon tetrabromide, benzyl chloride, benzyl bromide, organic thio compounds, such as primary, secondary or tertiary aliphatic thiols, such as ethanethiol, n-propanethiol, 2-propanethiol, n-butanethiol, 2-butanethiol, 2-methyl-2-propanethiol, n-pentanethiol, 2-pentanethiol, 3-pentanethiol, 2-methyl-2-butanethiol, 3-methyl-2-butanethiol, n-hexanethiol, 2-hexanethiol, 3-hexanethiol, 2-methyl-2-pentanethiol, 3-methyl-2-pentanethiol, 4-methyl-2-pentanethiol, 2-methyl-3-pentanethiol, 3-methyl-3-pentanethiol, 2-ethylbutanethiol, 2-ethyl-2-butanethiol, n-heptanethiol and its isomers, n-octanethiol and its isomers, n-nonanethiol and its isomers, n-decanethiol and its isomers, n-undecanethiol and its isomers, n-dodecanethiol and its isomers, n-tridecanethiol and its isomers, substituted thiols, such as 2-hydroxyethanethiol, aromatic thiols, such as benzenethiol, ortho-, meta-, or para-methylbenzenethiol, and also all other sulfur compounds described in Polymer Handbook $3^{rd}$ edition, 1989, J. Brandrup and E. H. Immergut, John Wiley & Sons, Section II, pages 133 to 141, and also aliphatic and/or aromatic aldehydes, such as acetaldehyde, propionaldehyde and/or benzaldehyde, unsaturated fatty acids, such as oleic acid, dienes with nonconjugated double bonds, such as divinylmethane, or vinylcyclohexane or hydrocarbons having readily abstractable hydrogen atoms, such as toluene, for example. It is, however, also possible to use mixtures of mutually compatible, abovementioned free-radical chain transfer compounds. The total amount of the free-radical chain transfer compounds used optionally, based on the total monomer amount, is generally ≦5% by weight, often ≦3% by weight, and frequently ≦1% by weight.

Depending on the stability of the aqueous dispersions of solids that are used, steps c) and d) of the process may be carried out in the acidic, neutral or basic pH range. When phyllosilicates are used, the pH is advantageously ≧5 ands ≦11, with particular advantage ≧6 and ≦10 (respective sample measured at room temperature and atmospheric pressure). The setting of the pH ranges is familiar to the skilled worker and is accomplished more particularly using nonoxidizing inorganic acids, such as hydrochloric, sulfuric or phosphoric acid, or inorganic bases, such as ammonia, sodium hydroxide or potassium hydroxide.

It will be appreciated that the aqueous composite-particle dispersions obtainable by the process of the invention may also comprise further, optional auxiliaries familiar to the skilled worker, such as, for example, what are called thickeners, defoamers, buffer substances, preservatives, etc., in standard quantities.

Where silane monomers are used in the process of the invention, in one preferred embodiment of the aqueous dispersion of solids that is introduced as an initial charge in step b) of the process, step c) of the process comprises the metered addition first only of ≧5% and ≦70% by weight, advantageously ≧10% and ≦50% by weight, of the total amount of the silane monomers, over a time of ≧5 and ≦240 minutes, advantageously ≧30 and ≦120 minutes, and with particular advantage ≧45 and ≦90 minutes, at a temperature of ≧20° C., with advantage at a temperature of ≧50 and ≦100° C., and with particular advantage at a temperature of ≧65 and ≦95° C., and only subsequently are any remaining, other ethylenically unsaturated monomers and the free-radical polymerization initiator metered in under polymerization conditions. The remainder of silane monomers is subsequently metered in in step d) of the process together with the other ethylenically unsaturated monomers, under polymerization conditions. The total amount of silane monomers in this preferred embodiment is ≧0.1% and ≦2% by weight, based on the total monomer amount.

The aqueous composite-particle dispersions obtainable by the process of the invention normally have a total solids content of ≧1% and ≦70%, frequently ≧5% and ≦65%, and often ≧10% and ≦60%, by weight.

The composite particles obtainable by the invention generally have particle diameters of >10 nm and ≦1000 nm, frequently ≧25 and ≦500 nm, and often ≧50 and ≦250 nm. The determination of the particle size of the composite particles takes place, in the context of this specification, generally by the method of quasielastic light scattering (DIN ISO 13321) using a High Performance Particle Sizer (HPPS) from Malvern Instruments Ltd.

The composite particles obtainable by the process of the invention can have different structures. These composite particles may comprise one or more of the finely divided inorganic solid particles. The finely divided inorganic solid particles may be completely enveloped by the polymer matrix. It is, however, also possible for some of the finely divided inorganic solid particles to be enveloped by the polymer matrix, while some others are disposed on the surface of the polymer matrix. As will be appreciated, it is also possible for a major fraction of the finely divided inorganic solid particles to be bound on the surface of the polymer matrix.

Also, the remaining amounts of unreacted ethylenically unsaturated monomers or other highly volatile compounds that are left in the aqueous polymerization medium after the conclusion of the polymerization reaction can be removed by means of steam stripping and/or inert-gas stripping or by means of chemical removal of residual monomers, as described, for example, in specifications DE-A 4419518, EP-A 767180 or DE-A 3834734, without disadvantageously changing the properties of the aqueous composite-particle dispersions.

The aqueous composite-particle dispersions formed by the process of the invention are stable and have a low coagulum content, generally ≦0.5%, preferably ≦0.1%, and with particular preference ≦0.05% by weight, based in each case on the aqueous composite-particle dispersion.

The coagulum content for the purposes of this specification is determined by filtering the aqueous composite-particle dispersion through a nylon sieve having a mesh size of 45 μm.

Addition-polymer films comprising inorganic solid particles can be produced in a simple way from the aqueous composite-particle dispersions obtainable by way of the process of the invention. As compared with addition-polymer films not comprising inorganic solid particles, these additional-polymer films generally feature enhanced mechanical strength, reduced whitening, improved adhesion to mineral surfaces, improved resistance to organic solvents, and enhanced scratch resistance, blocking resistance, and heat stability.

Aqueous composite-particle dispersions prepared in accordance with the process of the invention are thus particularly suitable, for example, as a binder, for producing a protective coat, for example, in coating formulations, as a component in adhesives or for modifying cement formulations and mortar formulations, or in medical diagnostics (cf., e.g., K. Mosbach and L. Andersson, Nature 270 (1977), pages 259 to 261; P. L. Kronick, Science 200 (1978), pages 1074 to 1076; and U.S. Pat. No. 4,157,323). Furthermore, the composite particles can also be used as catalysts in various aqueous dispersion systems.

It is also noted that the aqueous composite-particle dispersions obtainable in accordance with the invention can be dried in a simple way to form redispersible composite-particle powders (e.g., by freeze drying or spray drying). This is particularly the case when the glass transition temperature of the polymer matrix of the composite particles obtainable in accordance with the invention is ≧50° C., preferably ≧60° C., more preferably ≧70° C., very preferably ≧80° C., and with particular preference ≧90° C. or ≧100° C. The composite-particle powders are suitable, among other things, as additives for plastics, as components for toner formulations or as additives in electrophotographic applications, and also as components in cement formulations and mortar formulations.

The invention is illustrated in more detail with reference to the following, nonlimiting examples.

EXAMPLES a) Preparation of an Aqueous Composite-Particle Dispersion

Example 1

A 2 l four-necked flask equipped with a reflux condenser, a thermometer, a mechanical stirrer, and a metering device was charged at 20 to 25° C. (room temperature) and atmospheric pressure, under a nitrogen atmosphere and with stirring (200 revolutions per minute), with 416.6 g of Nalco® 1144 (40% by weight colloidal silicon dioxide with an average particle diameter of 14 nm [according to figures from the manufacturer]; trademark of Nalco), subsequently with 10.8 g of a 20% strength by weight aqueous solution of a $C_{16}C_{18}$ fatty alcohol ethoxylate having on average 18 ethylene oxide units (Lutensol® AT18; trademark of BASF SE), and subsequently with 315.0 g of deionized water, over the course of 5 minutes. Subsequently the initial charge mixture was heated to 70° C.

In parallel, as feed 1, a monomer mixture consisting of 12.6 g of methyl methacrylate, 18.8 g of n-butyl acrylate, and 1.5 g of methacrylic acid, as feed 2, 2.9 g (3-meth-acryloyloxypropyl)trimethoxysilane, as feed 3, an initiator solution composed of 2.1 g of sodium peroxodisulfate, 5.4 g of a 10% strength by weight aqueous solution of sodium hydroxide, and 193.0 g of deionized water, and also, as feed 4, a monomer mixture consisting of 87.5 g of methyl methacrylate, 131.2 g of n-butyl acrylate, and 2.5 g of hydroxyethyl methacrylate were prepared.

Subsequently added to the stirred initial charge mixture at 70° C., continuously over the course of 90 minutes via a separate feed line, was 0.9 g of feed 2. 45 minutes after the beginning of feed 2, the reaction mixture was heated to a reaction temperature of 85° C. An hour after the beginning of feed 2, beginning simultaneously, the total amount of feed 1 and 158.8 g of feed 3 were metered into the reaction mixture over a time of 120 minutes via two separate feed lines, with continuous volume flow rates. Subsequently, beginning simultaneously, the total amount of feed 4 and the remainder of feed 2, and also, over a period of 135 minutes, the remainder of feed 3 were subsequently metered into the reaction mixture over a time of 120 minutes via separate feed lines, with continuous volume flow rates. Subsequently the aqueous composite-particle dispersion obtained was stirred at reaction temperature for a further hour and thereafter was cooled to room temperature.

The resulting aqueous composite-particle dispersion was translucent and of low viscosity and had a solids content of 35.5% by weight and a coagulum content of <0.05% by weight, based in each case on the total weight of the aqueous composite-particle dispersion. The pH of the composite-particle dispersion was 9.1. The average size of the composite particles was found to be 117 nm. According to the method of analytical ultracentrifugation (AUC; in this regard cf. S. E. Harding et al., Analytical Ultracentrifugation in Biochemistry and Polymer Science, Royal Society of Chemistry, Cambridge, Great Britain 1992, Chapter 10, Analysis of Polymer Dispersions with an Eight-Cell-AUC-Multiplexer: High Resolution Particle Size Distribution and Density Gradient Techniques, W. Mächtle, pages 147 to 175) it was not possible to detect any free silicon dioxide particles.

The solids content was generally determined by drying about 1 g of the composite-particle dispersion to constant weight in an open aluminum crucible having an internal diameter of approximately 3 cm in a drying oven at 150° C. To determine the solids content, two separate measurements were conducted in each case and the corresponding average was formed.

For the determination of the coagulum content, around 500 g of the aqueous composite-particle dispersion were filtered at room temperature through a 45 μm nylon sieve which had been weighed prior to filtration. After filtration, the sieve was rinsed with a little deionized water (about 50 ml) and then dried in a drying cabinet at 100° C. under atmospheric pressure until a constant weight was reached (approximately 1 hour). After cooling to room temperature, the sieve was weighed again, the coagulum content was given by the difference between the two weighings based in each case on the amount of composite-particle dispersion used for filtration. Two determinations of the coagulum content were carried out in each case. The values reported in the respective examples correspond to the average values from these two determinations.

The size of the composite particles was determined generally by the method of quasielastic light scattering (DIN ISO 13321) using a High Performance Particle Sizer (HPPS) from Malvern Instruments Ltd.

The pH was determined generally by means of a Micropal pH538 instrument from Wissenschaftlich-Technische-Werkstätten (WTW) GmbH, at room temperature.

Comparative Example 1

Comparative example 1 was carried out in the same way as for example 1, except that the feed 1 used was 25.5 g of methyl methacrylate, 38.3 g of n-butyl acrylate, and 1.5 g of methacrylic acid, and the feed 4 used was 74.5 g of methyl methacrylate, 111.8 g of n-butyl acrylate, and 2.5 g of hydroxyethyl methacrylate.

The resulting aqueous composite-particle dispersion was white and of high viscosity and had a solids content of 35.1% by weight and a coagulum content of 1.17% by weight. The pH of the composite-particle dispersion was 9.3. The average particle size of the composite particles was found to be 185 nm. No free silicon dioxide particles were detected.

Comparative Example 2

Comparative example 2 was carried out in the same way as for example 1, except that the feed 1 used was 51.0 g of methyl methacrylate, 76.5 g of n-butyl acrylate, and 1.5 g of methacrylic acid, and the feed 4 used was 49.0 g of methyl methacrylate, 73.6 g of n-butyl acrylate, and 2.5 g of hydroxyethyl methacrylate.

However, it was necessary to discontinue the procedure, since, 45 minutes after the start of feed 4, the aqueous composite-particle dispersion underwent coagulation.

Comparative Example 3

Comparative example 3 was carried out in the same way as for example 1, except that the first portion of feed 3, added over the course of 120 minutes, was 79.5 g instead of 158.8 g, and the second portion, added over the course of 135 minutes, was 121.0 g instead of 41.7 g.

The resulting aqueous composite-particle dispersion was white and of low viscosity and had a solids content of 35.3% by weight and a coagulum content of 0.57% by weight, based in each case on the total weight of the aqueous composite-particle dispersion. The pH of the composite-particle dispersion was 9.2. The average particle size of the composite particles was found to be 168 nm. No free silicon dioxide particles were detected.

Example 2

Example 2 was carried out in the same way as for example 1, with the difference that the total amount of feed 2, was 3.8 g, the first portion of feed 2 metered in was 1.2 g instead of 0.9 g, over the course of 90 minutes, and the second portion metered in was 2.6 g instead of 2.0 g, over the course of 135 minutes, with the metering of the second portion taking place in such a way that the metering rate was first 0.007 g/min for 90 minutes and subsequently 0.044 g/min for 45 minutes.

The resulting aqueous composite-particle dispersion was translucent and of low viscosity and had a solids content of 35.6% by weight and a coagulum content of <0.05% by weight, based in each case on the total weight of the aqueous composite-particle dispersion. The pH of the composite-particle dispersion was 9.0. The average particle size of the composite particles was found to be 131 nm. No free silicon dioxide particles were detected.

Comparative Example 4

Comparative example 4 was carried out in the same way as for example 2, except that the first portion of feed 3, added over the course of 120 minutes, was 40.1 g instead of 158.8 g, and the second portion, added over the course of 135 minutes, was 160.4 g instead of 41.7 g.

The resulting aqueous composite-particle dispersion was white and of low viscosity and had a solids content of 34.8% by weight and a coagulum content of 1.43% by weight, based in each case on the total weight of the aqueous composite-particle dispersion. The pH of the composite-particle dispersion was 9.3. The average particle size of the composite particles was found to be 189 nm. No free silicon dioxide particles were detected.

Comparative Example 5

Comparative example 5 was carried out in the same way as for example 2, except that the first portion of feed 3, added over the course of 120 minutes, was 80.2 g instead of 158.8 g, and the second portion, added over the course of 135 minutes, was 120.3 g instead of 41.7 g.

The resulting aqueous composite-particle dispersion was white and of low viscosity and had a solids content of 35.0% by weight and a coagulum content of 1.11% by weight, based in each case on the total weight of the aqueous composite-particle dispersion. The pH of the composite-particle dispersion was 9.1. The average particle size of the composite particles was found to be 151 nm. No free silicon dioxide particles were detected.

Comparative Example 6

Comparative example 6 was carried out in the same way as for example 2, except that the first portion of feed 3, added over the course of 120 minutes, was 100.2 g instead of 158.8 g, and the second portion, added over the course of 135 minutes, was 100.3 g instead of 41.7 g.

The resulting aqueous composite-particle dispersion was white and of low viscosity and had a solids content of 35.2% by weight and a coagulum content of 0.68% by weight, based in each case on the total weight of the aqueous composite-particle dispersion. The pH of the composite-particle dispersion was 9.3. The average particle size of the composite particles was found to be 147 nm. No free silicon dioxide particles were detected.

b) Storage Stability Study

To test the storage stability, the aqueous composite-particle dispersions obtained in the inventive examples/comparative examples were diluted with stirring with deionized water to a solids content of 34.5% by weight; 200 g of each of the resultant diluted aqueous composite-particle dispersions was stored in a sealed 250 ml glass bottle at 70° C. and inspected daily for gelling (i.e., sharp increase in viscosity). Table 1 below lists the results obtained.

TABLE 1

| Determination of storage stability | |
|---|---|
| Composite-particle dispersion from | Gelling [in days] |
| Example 1 | 43 |
| Comparative example 1 | 8 |
| Comparative example 2 | — |
| Comparative example 3 | 22 |
| Example 2 | 47 |
| Comparative example 4 | 23 |
| Comparative example 5 | 27 |
| Comparative example 6 | 29 |

The invention claimed is:

1. A process for preparing an aqueous composite-particle dispersion comprising an addition polymer and finely divided inorganic solid particles, the process comprising:
   distributing at least one ethylenically unsaturated monomer dispersely in aqueous medium; and
   polymerizing the at least one monomer by free-radical aqueous emulsion polymerization with at least one free-radical polymerization initiator in the presence of at least one dispersely distributed, finely divided inorganic solid and at least one dispersant,
   a) wherein 1% to 1000% by weight of an inorganic solid having an average particle size $\leq$100 nm and 0.05% to 2% by weight of a free-radical polymerization initiator, based on a total amount of ethylenically unsaturated monomers, are employed,
   b) wherein at least a portion of the inorganic solid is comprised in an initial charge into the aqueous medium polymerization form in the form of an aqueous dispersion of solids, subsequently
   wherein, after the initial charge, the polymerizing comprises
   c) metering a total of $\geq$0.01% and $\leq$20% by weight of the total monomer amount while metering $\geq$60% by weight of a total amount of the free-radical polymerization initiator into the aqueous dispersion of solids resulting after the initial charge, and polymerizing the at least one ethylenically unsaturated monomer metered in, under polymerization conditions, up to a monomer conversion of $\geq$80% by weight, and subsequently
   d) metering any remainder of the inorganic solid, any remainder of the free-radical polymerization initiator, and the remainder of the at least one ethylenically unsaturated monomer into a resultant polymerization mixture under polymerization conditions, and carrying out polymerization to a monomer conversion of $\leq$90% by weight, and
   wherein the polymerizing steps c) and d) generate the aqueous composite-particle dispersion having a coagulum content of $\leq$0.5% by weight.

2. The process of claim 1, wherein, in b), $\leq$50% by weight of the inorganic solid is comprised in the initial charge.

3. The process of claim 1, wherein, in b), the total amount of the inorganic solid is comprised in the initial charge.

4. The process of claim 1, wherein a total of $\geq$1% and $\leq$15% by weight of the total amount of the at least one ethylenically unsaturated monomer is metered in in c).

5. The process of claim 1, wherein $\geq$70% by weight of the total amount of free-radical polymerization initiator is metered in in c).

6. The process of claim 1, wherein the inorganic solid comprises silicon.

7. The process of claim 1, wherein the inorganic solid comprises at least one selected from the group consisting of pyrogenic (fumed) silica, colloidal silica, and a phyllosilicate.

8. The process of claim 1, wherein the total amount of the ethylenically unsaturated monomers comprises ≧0.01% and ≦10% by weight of at least one ethylenically unsaturated monomer comprising a silicon-comprising functional group as a silane monomer.

9. The process of claim 8, wherein the silane monomer comprises at least one from the group consisting of (3-methacryloyloxypropyl)-trimethoxysilane, (3-methacryloyloxypropyl)methyldimethoxysilane, (3-methacryloyloxypropyl)dimethylmethoxysilane, (3-methacryloyloxypropyl)triethoxysilane, (methacryloyloxymethyl)methyldiethoxysilane, and (3 -methacryloyloxypropyl)methyldiethyloxysilane.

10. The process of claim 8, wherein only ≧5% and ≦70% by weight of the total amount of at least one silane monomer is metered into the aqueous dispersion of solids in c) over a time of ≧5 and ≦240 minutes, and subsequently any remaining other ethylenically unsaturated monomers and the free-radical polymerization initiator are metered in.

11. The process of claim 8, wherein a total amount of the silane monomers is ≧0.1% and ≦2% by weight, based on a total amount of all monomers.

12. The process of claim 1, wherein the dispersant comprises at least one selected from the group consisting of an anionic emulsifier and a non-ionic emulsifier.

13. The process of claim 1, wherein, on completion of d), the aqueous medium for polymerization comprises ≦10% by weight of organic solvent, based on a total amount of water.

14. The process of claim 2, wherein, in b), the total amount of the inorganic solid is comprised in the initial charge.

15. The process of claim 2, wherein a total of ≧1% and ≦15% by weight of the total amount of the at least one ethylenically unsaturated monomer is metered in in c).

16. The process of claim 3, wherein a total of ≧1% and ≦15% by weight of the total amount of the at least one ethylenically unsaturated monomer is metered in in c).

17. The process of claim 2, wherein ≧70% by weight of the total amount of free-radical polymerization initiator is metered in in c).

18. The process of claim 1, wherein the coagulum content is ≦0.1% by weight.

19. The process of claim 1, wherein the coagulum content is ≦0.05% by weight.

* * * * *